(12) United States Patent (10) Patent No.: US 12,570,188 B2

Larrison (45) Date of Patent: Mar. 10, 2026

(54) CHILD RESTRAINT

(71) Applicant: Dorel Juvenile Group, Inc., Foxboro, MA (US)

(72) Inventor: Matthew R. Larrison, Columbus, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 166 days.

(21) Appl. No.: 18/377,079

(22) Filed: Oct. 5, 2023

(65) Prior Publication Data

US 2024/0116409 A1 Apr. 11, 2024

Related U.S. Application Data

(60) Provisional application No. 63/384,263, filed on Nov. 18, 2022, provisional application No. 63/413,778, filed on Oct. 6, 2022.

(51) Int. Cl.
B60N 2/26 (2006.01)
B60N 2/28 (2006.01)

(52) U.S. Cl.
CPC ........... B60N 2/265 (2013.01); B60N 2/2806 (2013.01)

(58) Field of Classification Search
CPC .... B60N 2/265; B60N 2/2803; B60N 2/2806; B60N 2/2809; B60N 2/2821; B60N 2/2869
USPC ..................................................... 297/256.16
See application file for complete search history.

(56) References Cited

U.S. PATENT DOCUMENTS

| | | | | |
|---|---|---|---|---|
| 5,884,967 | A | * | 3/1999 | Gasper .................. B60N 2/286 |
| | | | | 297/256.16 |
| 7,029,069 | B2 | * | 4/2006 | Hendren .............. B60N 2/2869 |
| | | | | 297/256.12 |
| 7,216,932 | B2 | | 5/2007 | Emmert |
| 7,597,396 | B2 | | 10/2009 | Longenecker |
| 7,753,445 | B2 | | 7/2010 | Kassai |
| 7,988,230 | B2 | | 8/2011 | Heisey |
| 8,262,161 | B2 | * | 9/2012 | Fritz .................... B60N 2/2863 |
| | | | | 297/256.16 |
| 8,845,022 | B2 | | 9/2014 | Strong |
| 9,365,135 | B2 | | 6/2016 | Carpenter |
| 9,415,706 | B2 | * | 8/2016 | Rabeony .............. B60N 2/2824 |
| 9,469,222 | B2 | | 10/2016 | Williams |
| 10,710,478 | B2 | | 7/2020 | Reaves |
| 2017/0120783 | A1 | | 5/2017 | Denbo |
| 2021/0178938 | A1 | | 6/2021 | Williams |

(Continued)

FOREIGN PATENT DOCUMENTS

| | | | | | |
|---|---|---|---|---|---|
| EP | | 1145898 | A1 * | 10/2001 | ........... B60N 2/2809 |
| FR | | 2946582 | A1 * | 12/2010 | ........... B60N 2/2806 |

*Primary Examiner* — Milton Nelson, Jr.

(74) *Attorney, Agent, or Firm* — Barnes & Thornburg LLP

(57) ABSTRACT

A child restraint includes a seat base adapted to be secured to a vehicle seat. The seat base includes a seat-base foundation formed to include a vehicle seatbelt path and a vehicle seatbelt retainer coupled to the seat-base foundation and configured to pivot between a released position spaced away from the vehicle seatbelt path and a clamped position overlying the vehicle seatbelt path to clamp a vehicle seat belt to the seat-base foundation to secure the seat base to the vehicle seat. The child restraint further includes a juvenile seat adapted to be secured to the seat base and a seat connection system configured to maintain connection between the juvenile seat and the seat base.

15 Claims, 4 Drawing Sheets

(56)     References Cited

U.S. PATENT DOCUMENTS

| 2021/0237626 | A1 | 8/2021 | Longenecker |
| 2021/0394653 | A1 | 12/2021 | Li |

* cited by examiner

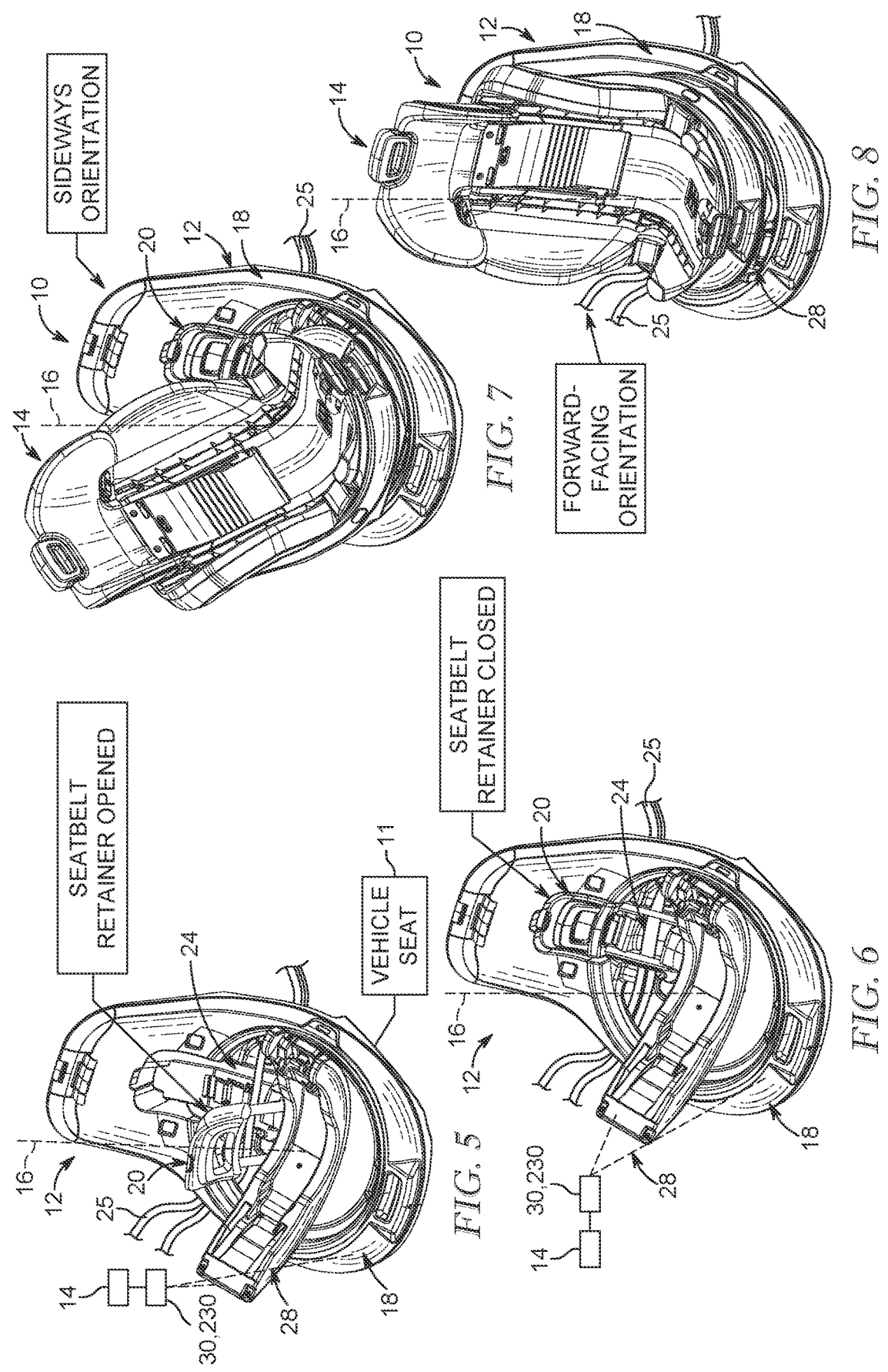

CHILD RESTRAINT

PRIORITY CLAIM

This application claims priority under 35 U.S.C. § 119(e) to U.S. Provisional Application Ser. No. 63/413,778, filed Oct. 6, 2022 and to U.S. Provisional Patent Application No. 63/384,263, filed Nov. 18, 2022, the disclosures of each of which are expressly incorporated by reference herein.

BACKGROUND

The present disclosure relates to child safety devices, and particularly to child seats. More particularly, the present disclosure relates to child seat for use in a vehicle.

SUMMARY

According to the present disclosure, a child restraint, in accordance with the present disclosure, includes a seat base adapted to be secured to a vehicle seat. The seat base includes a seat-base foundation formed to include a vehicle seatbelt path and a vehicle seatbelt retainer coupled to the seat-base foundation. The vehicle seatbelt retainer is configured to pivot between an opened or released position and a closed or clamped position. In the released position, the vehicle seatbelt retainer is spaced away from the vehicle seatbelt path. In the clamped position, the vehicle seatbelt retainer overlies the vehicle seatbelt path and clamps a vehicle seat belt to the seat-base foundation to secure the seat base to the vehicle seat.

In illustrative embodiments, the seat base further includes a seat-orientation controller coupled to the seat-base foundation. The seat-orientation controller is movable relative to the seat-base foundation and the vehicle seatbelt retainer. For example, the seat-orientation controller may be rotatable about a vertical rotation axis between a first position (i.e. a sideways orientation) in which the seat-orientation controller overlies the vehicle seatbelt retainer and blocks the vehicle seatbelt retainer from moving from the clamped position to the released position, and a second position (i.e. a forward-facing orientation or a rearward-facing orientation), in which the vehicle seatbelt retainer is exposed and is moveable between the clamped position and the released position.

In illustrative embodiments, the child restraint further includes a juvenile seat coupled to the seat base and configured to hold a child for transportation in a vehicle. In the illustrative embodiment, the juvenile seat is coupled directly to the seat-orientation controller for movement therewith relative to the seat-base foundation and to the vehicle seatbelt retainer. In other embodiments, the juvenile seat may be coupled directly to the seat-base foundation and the seat-orientation controller may be omitted.

In illustrative embodiments, the child restraint further includes a seat connection system configured to maintain connection between the juvenile seat and the seat-orientation controller or between the seat-base foundation and the juvenile seat. The juvenile seat is movable relative to the seat base between a use position and a base-installation position. In the use position, the juvenile seat is installed upright on the seat-orientation controller and can rotate about the vertical rotation axis with the seat-orientation controller. In the base-installation position, the juvenile seat is spaced apart from the seat base to provide clearance for the seatbelt retainer to move between the released position and the clamped position.

In illustrative embodiments, the seat connection system includes a tether configured to maintain connection between the juvenile seat and the seat base when the juvenile seat is in the base-installation position. In some embodiments, the tether extends between and interconnects the seat-base foundation and the juvenile seat. In some embodiments, the tether extends between and interconnects the seat-orientation controller and the juvenile seat.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective and diagrammatic view of a child restraint including seat base and a juvenile seat adapted to be secured to the seat base, the seat base having a seat-base foundation configured to mount to a vehicle seat and a vehicle seatbelt retainer configured to move from a released or opened position to expose a belt path surface of the seat base foundation and a clamped or closed position to clamp a vehicle seatbelt to the seat-base foundation while the juvenile seat is at least partially separated from the seat base;

FIG. 2 is a perspective view of the child restraint showing that the child restraint further includes a seat connection system configured to maintain connection between juvenile seat and the seat base, the seat connection system including a tether interconnecting the juvenile seat and the seat base to allow the juvenile seat to move from a use or installed position on the seat base to a base-installation position exposing the vehicle seatbelt retainer while still being connected to the seat base;

FIG. 3 is a perspective view of a second embodiment of a child restraint including a seat base, a juvenile seat adapted to be secured to the seat base, and a seat connection system configured to maintain connection between the seat base and the juvenile seat while the juvenile seat is in a base-installation position so that a user is able to access and move a vehicle seatbelt retainer between a released position and a clamped position, the seat connection system including a tether that is retractable from a seat-orientation controller included in the seat base;

FIG. 5 is a perspective and diagrammatic view of the of the seat base showing the seatbelt retainer in the opened position to expose the seatbelt path of the seat base foundation;

FIG. 6 is a view similar to FIG. 5 showing the seatbelt retainer in the closed position clamping the vehicle seat belt to the seat-base foundation;

FIG. 7 is a perspective view showing the juvenile seat mounted on the seat base in the use position and oriented in a sideways orientation after the seat-belt retainer has been moved to the closed position to clamp the vehicle seat belt to the seat-base foundation; and FIG. 8 is a perspective view showing the juvenile seat in the use position and rotated relative to the seat-base foundation to a forward-facing orientation to overlie the seat-belt retainer while the seat belt retainer is in the closed position.

DETAILED DESCRIPTION

Figure 1:
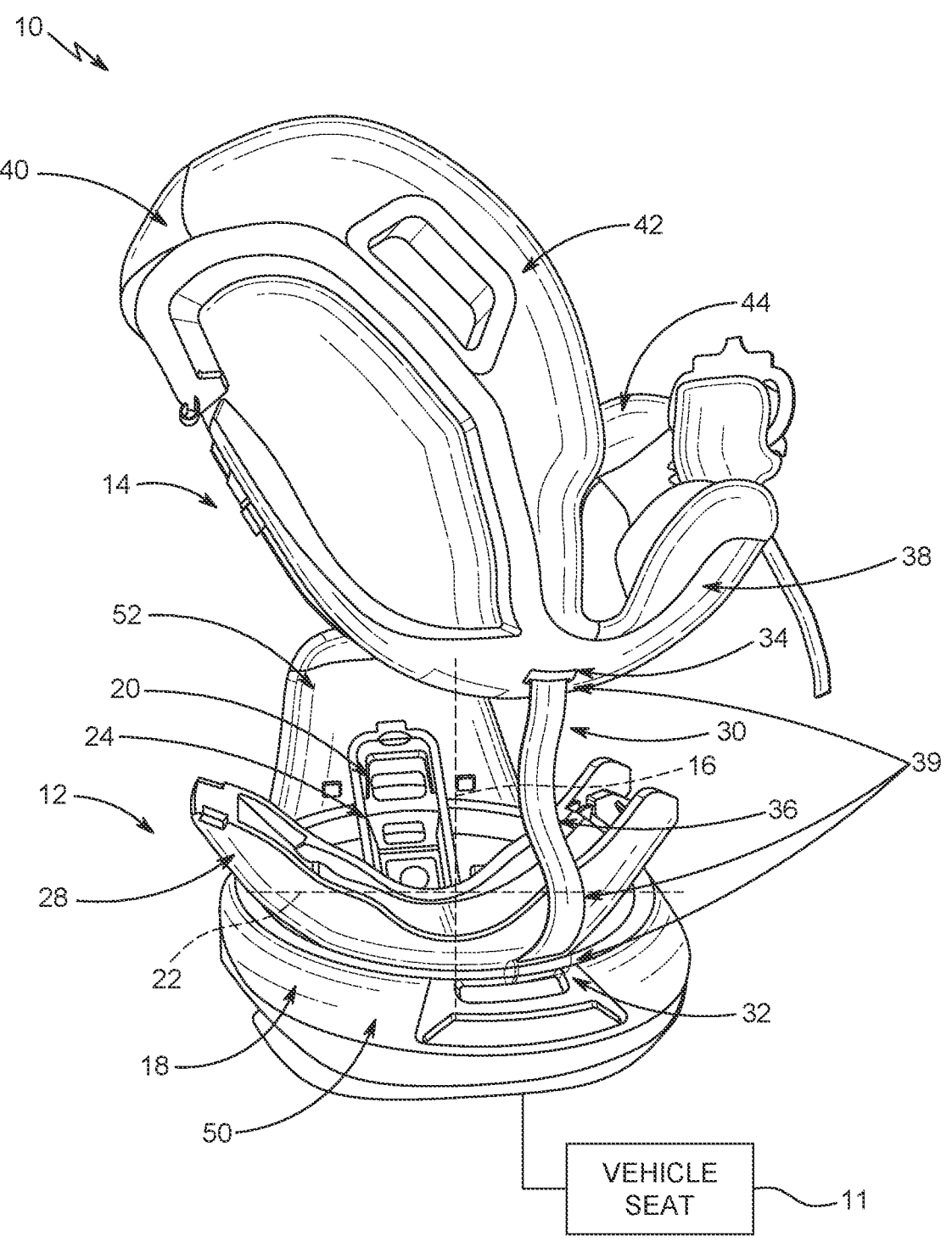

A child restraint 10 includes a seat base 12 adapted to rest on a vehicle seat 11 and a juvenile seat 14 coupled to the seat base 12 as shown in FIG. 1. The juvenile seat 14 is rotatable about a vertical rotation axis 16 to change the juvenile seat 14 from a forward facing orientation to a rearward facing orientation relative to the seat base 12. In some embodiments, the juvenile seat 14 is at least partially detachable from the seat base 12 so that the seat base 12 can be secured properly to the vehicle seat 11 prior to arrangement of the juvenile seat 14 in the forward facing orientation or the rearward facing orientation.

The seat base 12 includes a seat base foundation 18 and a vehicle seat-belt retainer 20 mounted to the seat base foundation 18 for pivotable movement about a retainer axis 22 between a released position and a clamped position. In the released position, a distal end of the vehicle seat-belt retainer 20 is spaced apart from the seat base foundation 18 to expose a vehicle seatbelt path 24. In the clamped position, the vehicle seat-belt retainer 20 overlies the vehicle seatbelt path 24 and is configured to clamp a vehicle seat belt between the vehicle seatbelt retainer 20 and the seat base foundation 18 to secure the seat base 12 to the vehicle seat 11. Reference is hereby made to U.S. Publication No. US-2023/0045293 filed Aug. 5, 2022 and entitled SEAT BASE FOR A CHILD RESTRAINT for disclosure relating to use of a vehicle seat-belt retainer, which application is hereby incorporated in its entirety herein.

Figure 2:
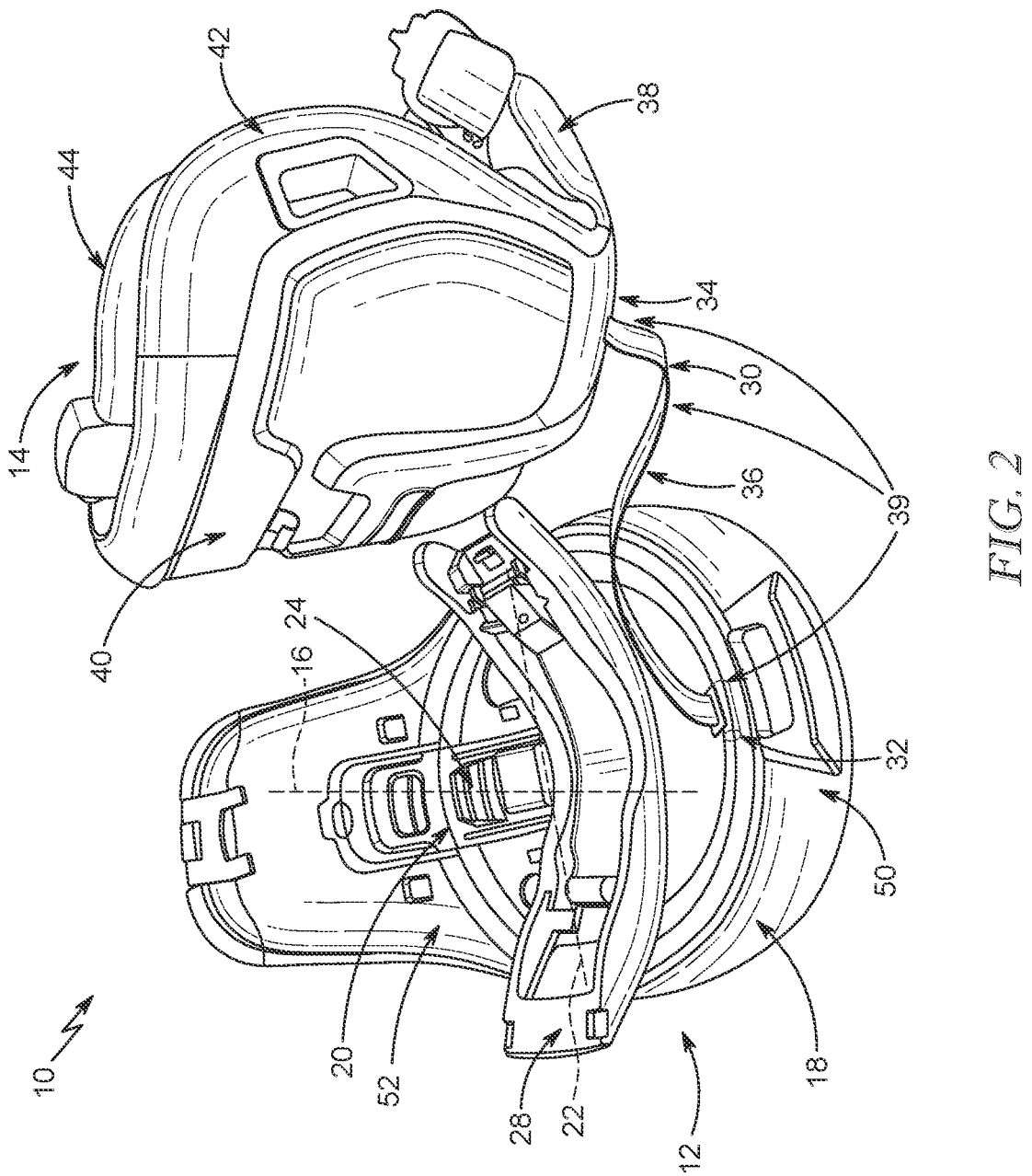

The seat base 12 may further include a seat-orientation controller 28 coupled to the seat-base foundation 18 as shown in FIGS. 1 and 2. The seat-orientation controller 28 is configured to secure the juvenile seat 14 to the seat base 12 and allows selective rotation of the juvenile seat 14 relative to the seat base foundation 18 about the vertical rotation axis 16 with the juvenile seat 14. The seat-orientation controller 28 may also allow selective recline of the juvenile seat 14 relative to the seat base foundation 18. In some embodiments, the vehicle seatbelt retainer 20 may only be able to move from the clamped position to the release position when the juvenile seat 14 is at least partially detached from the seat-orientation controller 28. Reference is hereby made to U.S. Provisional Application No. 63/419, 505 filed Oct. 26, 2022 and entitled CHILD RESTRAINT for disclosure relating to use of a seat-orientation controller for juvenile seat attachment, rotation, and recline capabilities, which application is hereby incorporated in its entirety herein.

The child restraint 10 in the illustrative embodiment further includes a connector system 30 configured to maintain connection between the seat base 12 and the juvenile seat 14 when the juvenile seat 14 is at least partially detached from the seat-orientation controller 28 as shown in FIGS. 1 and 2. The connector system 30 includes a base attachment 32, a seat attachment 34, and a strap or tether 36 interconnecting the base attachment 32 and the seat attachment 34 as shown in FIGS. 1 and 2. The base attachment 32 is coupled to the seat base foundation 18 and is configured to join the connector system 30 with the seat base foundation 18 of the seat base 12. The seat attachment 34 is coupled to the juvenile seat 14 and is configured to join the connector system 30 with the juvenile seat 14. The tether 36 can include a webbed strap, a cable, a string, a yarn, a band, or any other suitable tether structure to tie the juvenile seat 14 together with the seat base 12.

One or both of the base attachment 32 and the seat attachment 34 of the connector system 30 may be a fixed joint while the other may include a tether retractor 39 that is configured to allow extension and retraction of the tether 36 from at least one of the seat base 12 and/or the juvenile seat 14 as suggested by FIGS. 1 and 2. In this way, the tether retractor 39 may be configured to draw the tether 36 back into the seat base 12 and/or the juvenile seat 14. When the juvenile seat 14 is at least partially detached from the seat-orientation controller 28, the tether retractor 39 allows the tether 36 to extend outwardly away from one or both of the base attachment 32 and the seat attachment 34 as shown in FIGS. 1 and 2. In some embodiments, both the base attachment 32 and the seat attachment 34 include tether retractors 39.

In one embodiment, the tether retractor 39 is an elastic bungee formed in the tether 36 or on the tether 36 or an elastic member coupled to the tether 36. In another embodiment, the tether 36 is wound or rolled into a coil by a spring, for example. The coil may be located internal to the seat-base foundation 18 (or the seat-orientation controller 28) or the juvenile seat 14. The tether retractor 39 may be automatic or may require a user to engage with a button or similar mechanism to allow retraction and/or extension.

The base attachment 32 may be located at any suitable location on the seat base foundation 18, such as on a front 50, a rear 52, or on either side of the seat base foundation 18, as suggested in FIGS. 1 and 2. In one embodiment, the base attachment 32 is fixed on the seat base foundation 18. In another embodiment, the base attachment 32 is moveable relative to the seat base foundation 18. For example, base attachment 32 may rotate about axis 16 with juvenile seat 14 and seat-orientation controller 28.

The juvenile seat 14 includes a seat bottom 38 and a seat back 40 arranged to extend upwardly from the seat bottom 38 as shown in FIGS. 1 and 2. The seat attachment 34 may be located on the seat bottom 38 as shown in FIGS. 1 and 2. In another embodiment, the seat attachment 34 is located on the seat back 40.

The juvenile seat 14 further includes a first lateral side 42 and a second lateral side 44 opposite the first lateral side 42. In some embodiments, the seat attachment 34 is located on the first side 42 of the juvenile seat 14. In another embodiment, the seat attachment 34 is located on the second side 44 of the juvenile seat 14.

Figures 3, 4:
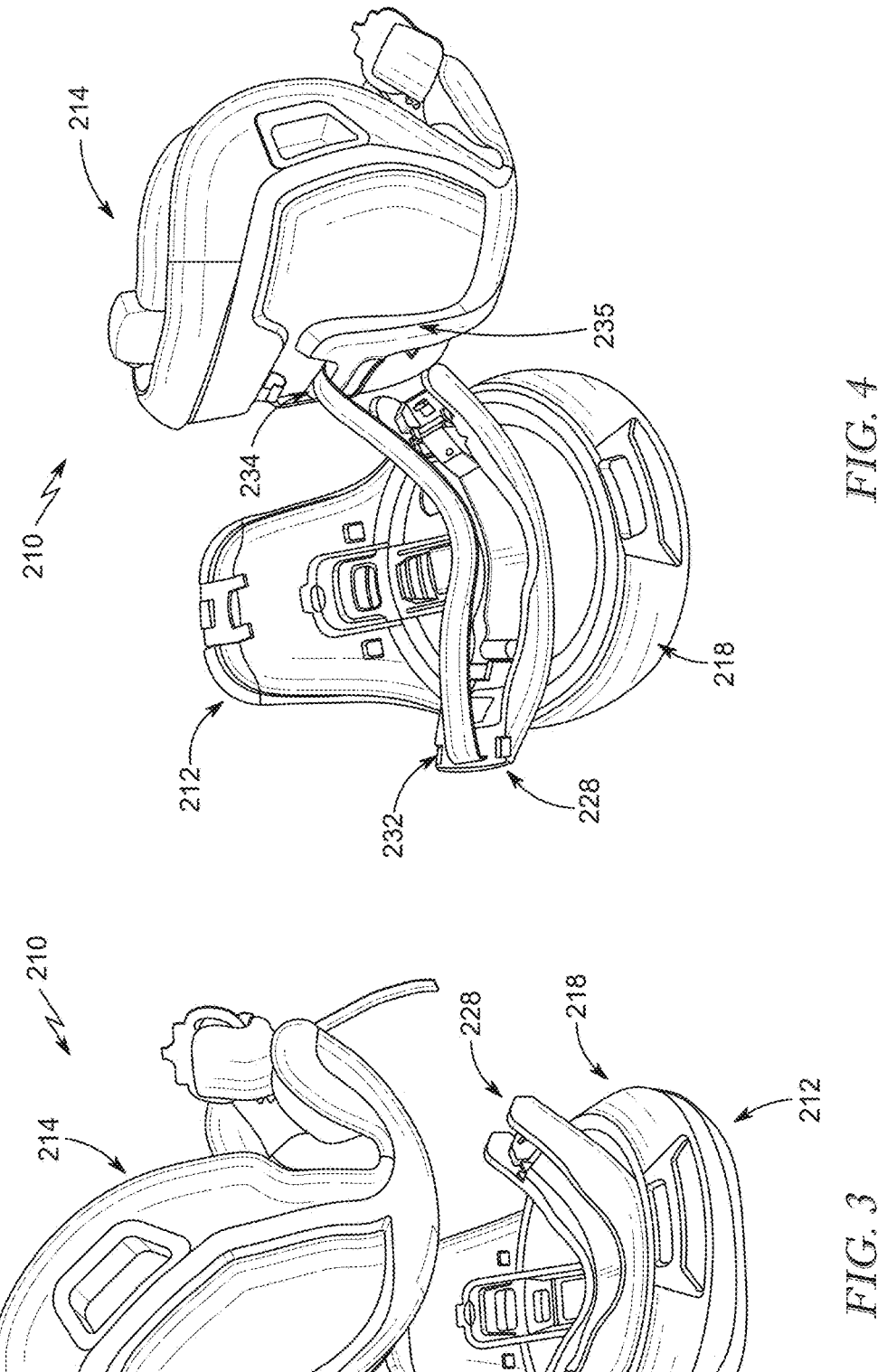
FIG. 4 is another perspective view of the second embodiment of the child restraint showing the tether extended so that the juvenile seat can be placed on a neighboring vehicle seat while the seat base is installed using the seatbelt retainer.

Another embodiment of a child restraint 210 is shown in FIGS. 3 and 4. Child restraint 210 is substantially similar to child restraint 10 except that the child restraint 210 includes a seat connection system 230 having a base attachment 232 is located on a seat-orientation controller 228 instead of seat-base foundation 218. Seat-orientation controller 228 is substantially similar to seat-orientation controller 28. In the illustrative embodiment, a base attachment 232 is coupled to a rear end 233 of the seat orientation controller 228 and a seat attachment 234, also included in seat connection system 230, is coupled to a rear end 235 of juvenile seat 214. A tether 236 extends between the base attachment 232 and the seat attachment 234. In other embodiments, the base attachment 232 and seat attachment 234 may be coupled to other areas of seat base 212 and juvenile seat 214, respectively.

FIGS. 5-8 show seat base 12 in various positions with juvenile seat 14. It should be noted that seat base 12 is substantially similar to seat base 212. Accordingly, juvenile seat 214 and connector system 230 can be used with the seat base 12 shown in FIGS. 5-8.

FIG. 5 shows the vehicle seatbelt retainer unlocked from the seat-base foundation 18 and in the opened position exposing the seatbelt path 24. To assume the opened position, the seat-orientation controller 28 has been rotated about the vertical rotation axis 16 to a sideways orientation. The juvenile seat 14 is shown diagrammatically in FIGS. 5 and 6 in the base-installation position while the seat-orientation controller 28 is in the sideways orientation. In these positions, the juvenile seat 14 and the seat-orientation controller 28 provide clearance for a user to open the seatbelt retainer 20 and route a vehicle seatbelt 25 across the seatbelt path 24 of the seat-base foundation 18. Once the vehicle seatbelt 25 is placed within the seatbelt path 24 the seatbelt retainer 20 can be pivoted to the closed position to clamp the vehicle seatbelt 25 in place and secure the child restraint 10 to the vehicle seat 11.

FIGS. 6 and 7 show the juvenile seat 14 in the use position after the seatbelt retainer 20 has been moved to the clamped position. The use position of the juvenile seat 14 can be a sideways orientation facing a door of the vehicle for child ingress and egress or a transportation orientation (i.e. forward-facing or rearward facing) for child transportation in the vehicle. It should be appreciated that the seat-orientation controller 28 is movable with the juvenile seat 14 to the sideways orientation or the transportation orientation.

The invention claimed is:

1. A child restraint comprising a seat base adapted to be secured to a vehicle seat, the seat base comprising a seat-base foundation formed to include a vehicle seatbelt path, a vehicle seatbelt retainer coupled to the seat-base foundation and configured to pivot between a released position spaced away from the vehicle seatbelt path and a clamped position overlying the vehicle seatbelt path to clamp a vehicle seat belt to the seat-base foundation to secure the seat base to the vehicle seat, and a seat-orientation controller coupled to the seat-base foundation and movable relative to the seat-base foundation and the vehicle seatbelt retainer about a vertical rotation axis between a first position in which the seat-orientation controller overlies the vehicle seatbelt retainer and blocks the vehicle seatbelt retainer from moving from the clamped position to the released position, and a second position, in which the vehicle seatbelt retainer is exposed and is moveable between the clamped position and the released position, a juvenile seat coupled to the seat-orientation controller for movement therewith relative to the seat-base foundation and to the vehicle seatbelt retainer, and a seat connection system configured to maintain connection between the juvenile seat and the seat-orientation controller, the seat connection system including a tether interconnecting the seat-orientation controller and the juvenile seat, wherein the juvenile seat is movable relative to the seat base between a use position in which the juvenile seat is installed on the seat-orientation controller to rotate about the vertical rotation axis with the seat-orientation controller, and a base-installation position, in which the juvenile seat is spaced apart from the seat-orientation controller and connected to the tether while the seat-orientation controller is in the second position so that vehicle seatbelt retainer is free to pivot between the released position and the clamped position.

2. The child restraint of claim 1, wherein the seat connection system further includes a base attachment coupled to the seat-orientation controller and a first end of the tether and a seat attachment coupled between the juvenile seat and an opposite, second end of the tether.

3. The child restraint of claim 2, wherein the base attachment includes a tether retractor configured to retract a portion of the tether toward the seat-orientation controller.

4. The child restraint of claim 3, wherein the tether retractor includes an elastic member.

5. The child restraint of claim 3, wherein the tether retractor includes a spool and a biasing member configured to wind the tether around the spool.

6. The child restraint of claim 2, wherein the seat attachment includes a tether retractor configured to retract a portion of the tether toward the juvenile seat.

7. The child restraint of claim 6, wherein the tether retractor includes an elastic member.

8. The child restraint of claim 6, wherein the tether retractor includes a spool and a biasing member configured to wind the tether around the spool.

9. The child restraint of claim 2, wherein the base attachment includes a first tether retractor configured to retract a first portion of the tether toward the seat-orientation controller and the seat attachment includes a second tether retractor configured to retract a second portion of the tether toward the juvenile seat.

10. The child restraint of claim 9, wherein the first tether retractor include a first spool located in an interior of the seat-orientation controller and a first biasing member configured to wind the first portion of the tether around the first spool, and the second tether retractor includes a second spool located within an interior of the juvenile seat and a second biasing member configured to wind second portion of the tether around the second spool.

11. A child restraint comprising a seat base adapted to be secured to a vehicle seat and formed to include a vehicle seatbelt path, a juvenile seat configured to be installed on the seat base, and a seat connection system configured to maintain connection between the juvenile seat and the seat base, the seat connection system including at least one tether coupled between the juvenile seat and the seat base, wherein the juvenile seat is movable relative to the seat base between a use position in which the juvenile seat is installed on the seat base, and a base-installation position, in which the juvenile seat is separated from the seat base while the at least one tether remains connected to both the seat base and the juvenile seat so that the seatbelt path is exposed to receive a vehicle seatbelt, wherein the seat connection system further includes a base attachment coupled between the seat base and a first end of the tether and a seat attachment coupled between the juvenile seat and an opposite, second end of the tether, wherein the base attachment includes a tether retractor configured to retract a portion of the tether toward the seat base, and wherein the tether retractor includes a spool and a biasing member configured to wind the tether around the spool.

12. A child restraint comprising a seat base adapted to be secured to a vehicle seat and formed to include a vehicle seatbelt path, a juvenile seat configured to be installed on the seat base, and a seat connection system configured to maintain connection between the juvenile seat and the seat base, the seat connection system including at least one tether coupled between the juvenile seat and the seat base, wherein the juvenile seat is movable relative to the seat base between a use position in which the juvenile seat is installed on the seat base, and a base-installation position, in which the juvenile seat is separated from the seat base while the at least one tether remains connected to both the seat base and the juvenile seat so that the seatbelt path is exposed to receive a vehicle seatbelt, wherein the seat connection system further includes a base attachment coupled between the seat base and a first end of the tether and a seat attachment coupled between the juvenile seat and an opposite, second end of the tether, and wherein the seat attachment includes a tether retractor configured to retract a portion of the tether toward the juvenile seat.

13. The child restraint of claim 12, wherein the tether retractor includes an elastic member.

14. The child restraint of claim 12, wherein the tether retractor includes a spool and a biasing member configured to wind the tether around the spool.

15. A child restraint comprising a seat base adapted to be secured to a vehicle seat and formed to include a vehicle seatbelt path, a juvenile seat configured to be installed on the seat base, and a seat connection system configured to maintain connection between the juvenile seat and the seat base, the seat connection system including at least one tether coupled between the juvenile seat and the seat base, wherein the juvenile seat is movable relative to the seat base between a use position in which the juvenile seat is installed on the seat base, and a base-installation position, in which the juvenile seat is separated from the seat base while the at least one tether remains connected to both the seat base and the juvenile seat so that the seatbelt path is exposed to receive a vehicle seatbelt, and wherein the tether includes a strap and an elastic member configured to retract the strap.

* * * * *